United States Patent Office 3,285,973
Patented Nov. 15, 1966

3,285,973
PROCESS FOR RECOVERING PHENOL FROM PHENOL-CONTAINING WATER
Sumio Arai, Makoto Funatsu, and Hisahiro Kita, Wakayama, Japan, assignors to Kao Soap Company, Ltd., Tokyo, Japan, a corporation of Japan
No Drawing. Filed Mar. 26, 1963, Ser. No. 267,950
Claims priority, application Japan, Mar. 28, 1962, 37/11,415, 37/11,416
5 Claims. (Cl. 260—621)

This invention relates to a process for recovering phenol from phenol-containing water and more particularly it relates to a process for recovering phenol from phenol-containing water by solvent extraction and distillation.

Hitherto, for recovering phenol from phenol-containing water formed as drainage in chemical industries, particularly in coke factories, dry-distillation factories, steel mills, etc., a process has been used in which phenol is recovered by extracting same using an oxygen-containing solvent insoluble in water and having a boiling point lower than that of phenol, such as diisopropyl ether, and then distilling off the solvent from the extract. According to another process, phenol is recovered by extracting same using an extracting solvent consisting of a nonpolar solvent having a low boiling point, such as benzene, and an organic base, such as pyridine, back-extracting with an aqueous alkaline solution to recover phenol as a phenolate

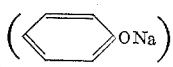

and then neutralizing the phenolate with an inorganic acid. However, there are drawbacks in the former extraction process using diisopropyl ether in that the price of diisopropyl ether is high, the resolution loss of the solvent in the water is large (the solubility of the solvent in water is 1.3% at 20° C.) and a complex process is required in order to recover diisopropyl ether from the water from which phenol has been removed. In the latter extraction process using benzene with an organic base, there is a drawback even though the resolution loss of benzene is less (the solubility of benzene in water is 0.8% at 20° C.) in that it requires a back extraction with an alkaline solution.

In accordance with the process of this invention, phenol is extracted from phenol-containing water by solvent extraction using as an extraction solvent an organic amine having a boiling point higher than that of phenol, the amine being used by itself or in an organic solvent. The double compound of phenol with the organic amine formed in the thus extracted solution is decomposed by heating the solution, and phenol is recovered by distillation leaving as a distillation residue the amine which can then be recycled in the extraction process. In the process of the invention, by simply heating the extracted solution the amine-phenol double compound in the extracted solution can be decomposed into phenol and the amine and at the same time phenol can be distilled out. By the process of this invention, as compared with the above-mentioned conventional two processes, the procedure is simplified and, as phenol is liberated by distillation, phenol of high purity can be obtained. The organic amine used in the process of this invention is a compound having a boiling point higher than that of phenol, its solubility in water is low and the resolution loss is very much less (the solubility is about 5–15 p.p.m.). Also, in regard to the organic solvent used in this invention, if an organic solvent having a boiling point higher than that of phenol is used as the solvent, the resolution loss is very much less. Even in the case where an organic solvent having a boiling point lower than that of phenol, such as benzene, is used, the process is very much simplified because phenol can be recovered by a simple heating or distillation without the need of a back extraction with an alkaline solution as is used in the conventional process in which benzene is also used.

It has been known hitherto that an amide is formed by heating an organic acid salt of a primary amine or a secondary amine according to the following dehydration reactions:

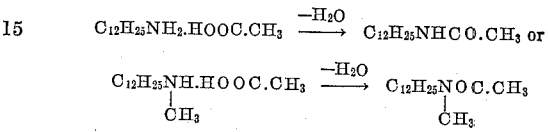

However, the inventors have found, as the result of precise investigations of double compounds of phenol and the amines, that the double compound can be easily decomposed into phenol and the amine without accompanying dehydration, which is different from the case of the above-described organic acid salt. The inventors have also found that a double compound of phenol with a tertiary amine can be decomposed, without accompanying side reactions, such as decomposition of the amine and decomposition of phenol, into the amine and phenol, which can then be recovered. As the result of such fundamental studies, the novel process of this invention has been devised.

As the organic amines that can be used in the invention, any one of the primary amines, the secondary amines and the tertiary amines having a boiling point higher than that of phenol (B.P. 182° C.) can be used but it is preferable to use coconut oil amines (B.P. 280–300° C.) where a primary amine is used, dioctylamine (B.P. 270–300° C.), N-benzyloctylamine, N-cyclohexyloctylamine, etc., where a secondary amine is used, and dimethyloctadecylamine (B.P. 320° C.) or tri-n-octylamine (B.P. 320° C.) where a tertiary amine is used.

The organic solvents that can be used in this invention can be roughly divided into ones having a boiling point lower than that of phenol and ones having a boiling point higher than that of phenol.

As the solvent having a boiling point lower than that of phenol, solvents having a solubility in water at room temperature of less than 2 g. to 100 g. of water and a boiling point lower than 150° C./760 mm. Hg are preferred. Suitable solvents of this type include aliphatic and alicyclic hydrocarbons, such as cyclohexane, n-heptane, n-hexane, etc.; aromatic hydrocarbons, such as benzene, toluene, xylene, etc.; ketones such as methylisobutyl ketone (B.P. 114–117° C.) etc.; ethers, such as isopropyl ether, n-butyl ether, etc.; esters, such as n-butyl acetate (B.P. 118–128° C.), carboxylic acid ester, etc.; and halogenated hydrocarbons such as trichloroethylene, etc.

As the solvent having a boiling point higher than that of phenol, it is preferable to use solvents having a solubility in water at room temperature of less than 1 g. to 100 g. of water and a boiling point higher than 200° C./760 mm. Hg. Suitable solvents of this latter type include hydrocarbons, such as high-boiling point kerosene (B.P. above 200° C.), light oils, alkylbenzene (e.g., dodecylbenzene), etc.; ethers, such as butyl carbitol (B.P.

248–258° C.), n-hexyl ether, etc.; and phosphoric acid esters, such as tributyl phosphate, tricresyl phosphate, etc.

A conventional solvent extraction procedure can be used for carrying out this invention. Thus, the phenol-containing water to be treated is continuously supplied to the first cell of a mixer-settler system comprised of one or several cells. An organic phase containing the organic amine is supplied to the last cell of the system and flows therethrough countercurrently to the phenol-containing water being treated. The organic phase removed from the first cell is fed through a separation column in which the water carried by the organic phase is removed. Then the organic phase is fed to a distilling column. Where an organic solvent having a boiling point lower than that of phenol is used, the solvent is first distilled off in the distilling column and then phenol is separated under a reduced pressure of about 5 mm. Hg. The recovered solvent and organic amine which is separated as the distillation residue are used again. Where an organic solvent having a boiling point higher than that of phenol is used, phenol is distilled out under a reduced pressure of about 5 mm. Hg and the extraction solvent and amine which are separated as the distillation residue are used again as is. Further, in lieu of the mixer-settler system, a column type extracting apparatus can be used.

The invention will be further explained by reference to the following examples.

Example 1

Phenol was recovered from drainage from a coke factory which drainage originally contained 2.28 g./l. of phenol, 7.8 g./l. of ammonia and other impurities. As the extraction solvent, a 20% dodecylbenzene (B.P. 280–360° C./760 mm. Hg) solution of coconut oil amine from which low boiling point fractions were removed (amine value 280, B.P. 280–300° C./760 mm. Hg) was used and continuous counter-current extraction was carried out at 30° C. using 5 parts of the aqueous phase and 1 part of the organic phase (aqueous phase/organic phase=5/1). The extract was distilled by heating under a reduced pressure of about 5 mm. Hg to distill out only phenol and phenol having a melting point at 38° C. was obtained. In the treated drainage, there remained only 5 mg./l. of phenol, 15 p.p.m. of dodecylbenzene and 10 p.p.m. of the amine. The amine value of the extraction solvent from which phenol was distilled out was 58, which shows that the amine was not decomposed in the operation.

Example 2

Drainage having the same composition as that in Example 1 was subjected to a continuous counter-current extraction at 30° C. using as the extraction solvent a 10% kerosene (from which low boiling point components were removed and the boiling point of which was higher than 200° C.) solution of dioctylamine (amine value 235, B.P. 270–300° C./760 mm. Hg) with a liquid ratio of 5 parts of the aqueous phase to 1 part of the organic phase (aqueous phase/organic phase=5/1). The extract was distilled by heating under a reduced pressure of 5 mm. Hg to distill out only phenol and phenol having a melting point of 38° C. was obtained. The treated drainage contained only 8 mg./l. of phenol and 5 p.p.m. of the amine. The amine value of the extraction solvent from which phenol was distilled out was 23.

Example 3

Drainage having the same composition as in Example 1 was subjected to a continuous counter-current extraction at 30° C. using as the solvent a 20% benzene solution of a coconut oil amine mixture from which octylamine and decylamine were removed (amine value 280, B.P. 280–300° C.). After distilling off benzene under a normal pressure, phenol was distilled out under a reduced pressure of 5 mm. Hg. Phenol having a melting point of 38° C. was obtained. The treated drainage contained 5 mg./l. of phenol and 15 p.p.m. of the amines. The amine value of the extraction solvent from which phenol was separated was 278, which indicated that the amines used in the process of this invention were not changed.

Example 4

The recovery of phenol from phenol resin wash water containing 10.1 g./l. of phenol was carried out. As the extraction solvent, dibutyl phthalate containing 20% of dimethyloctadecylamine (amine value 175, B.P. 320° C./760 mm. Hg) was used and the counter-current extraction was carried out continuously at 20° C. with a liquid ratio of 4 parts of the aqueous phase to 1 part of the organic phase. After the extraction, the extracted solution was immediately heated at 70° C. under a reduced pressure of 5 mm. Hg to distill out phenol. Phenol having a melting point of 37° C. was obtained. The treated drainage contained only 8 mg./l. of phenol, 10 p.p.m. of dibutyl phthalate and 5 p.p.m. of the amine, and the amine value of the extraction solvent from which phenol was removed was 35.

Example 5

Phenol resin wash water having the same composition as in Example 4 was subjected to the extraction using as the extraction solvent toluene containing 20% of dimethyloctadecylamine (amine value 175) and controlling the flow rates of the feeds so that the liquid ratio of the aqueous phase to the organic phase was 3/1. After distilling off toluene from the extracted solution under a normal pressure, phenol was distilled by heating under a reduced pressure of 5 mm. Hg. Phenol having a melting point at 39° C. was obtained. The amine value of the distillation residue was 174, which shows that the amine was not decomposed.

Example 6

Phenol resin wash water having the same composition as in Example 4 was subjected to extraction using as the extraction solvent isopropyl ether containing 30% of dioctylamine (amine value 235, B.P. 270–300° C./760 mm. Hg) with a liquid ratio of 5 parts of the aqueous phase to 1 part of the organic phase. After distilling isopropyl ether from the extract, the extract was distilled by heating under a reduced pressure of 5 mm. Hg and phenol having a melting point of 38° C. was obtained.

Example 7

A phenol resin wash water having the same composition as in Example 4 was subjected to counter-current extraction at 20° C. using tri-n-octylamine (amine value 158, B.P. above 320° C./760 mm. Hg) with a liquid ratio of 3 parts of the aqueous phase to 1 part of the organic phase. The extract, after the extraction, was immediately distilled by heating to distill out phenol at 70° C. under a reduced pressure of 5 mm. Hg. Phenol having a melting point of 38° C. was obtained. The treated drainage was found to contain 8 mg./l. of phenol and 5 p.p.m. of the amine. The amine value of the amine in the distillation residue was 157, which indicated the amine was unchanged.

What is claimed is:

1. A process for recovering substantially pure phenol from a dilute aqueous solution thereof comprising: carrying out a liquid-liquid counter-current solvent extraction on said solution, using as extraction solvent an amine selected from the group consisting of (1) coconut oil amines, dioctylamine, N-benzyloctylamine, N-cyclohexyloctylamine, dimethyloctylamine and tri-n-octylamine, and (2) said amine dissolved in a solvent selected from the group consisting of cyclohexane, n-heptane, n-hexane, benzene, toluene, xylene, methylisobutyl ketone isopropyl ether, n-butyl ether, n-butyl acetate, carboxylic acid ester, trichlorethylene, kerosine, light oils, dodecylbenzene, butyl carbitol, n-hexyl ether, tributyl phosphate and tricresylphosphate; to recover an aqueous phase and a non-aqueous extract phase containing a phenol-amine compound, heating said non-aqueous extract phase at reduced pressure to simultaneously decompose said compound and to vaporize the phenol; and recovering substantially pure phenol from the vapor of the heating operation.

2. The process as claimed in claim 1, in which the amine used is a coconut oil amine mixture free of octylamine and decylamine and said amine mixture has a boiling point of 280–300° C./760 mm. Hg.

3. The process as claimed in claim 1, in which the amine used is a secondary amine selected from the group consisting of dioctylamine, N-benzyloctylamine, and N-cyclohexyloctylamine.

4. The process as claimed in claim 1, in which the organic amine used is dimethyloctadecylamine.

5. The process as claimed in claim 1, in which the organic amine used is tri-n-octylamine.

References Cited by the Examiner
UNITED STATES PATENTS

| 1,942,838 | 1/1934 | Semon | 260—621 |
| 2,618,666 | 11/1952 | Hess et al. | 260—627 |
| 2,705,246 | 3/1955 | Knust | 260—621 |
| 2,829,175 | 4/1958 | Bowman et al. | 260—621 |

FOREIGN PATENTS 759,010  10/1956  Great Britain.

LEON ZITVER, *Primary Examiner.*

HAROLD G. MOORE, *Examiner.*

D. M. HELFER, *Assistant Examiner.*